United States Patent
Johnson et al.

(10) Patent No.: US 8,511,695 B2
(45) Date of Patent: Aug. 20, 2013

(54) SCOOTER HANDLEBAR HOLDER

(75) Inventors: Mark Johnson, Cary, IL (US); Emily Rivard, Chicago, IL (US); Katherine Powers, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 629 days.

(21) Appl. No.: 12/644,926

(22) Filed: Dec. 22, 2009

(65) Prior Publication Data
US 2011/0148061 A1 Jun. 23, 2011

(51) Int. Cl.
B62M 1/00 (2010.01)
(52) U.S. Cl.
USPC .................................. 280/87.041; 280/87.05
(58) Field of Classification Search
USPC .................... 280/87.041, 87.042, 87.05, 655, 280/655.1, 287; 16/421, 900; 403/103
See application file for complete search history.

(56) References Cited

U.S. PATENT DOCUMENTS

| | | | |
|---|---|---|---|
| 4,611,818 A * | 9/1986 | Cammarata | 280/278 |
| 4,634,138 A * | 1/1987 | Fryer et al. | 280/278 |
| 4,955,628 A * | 9/1990 | Chiu | 280/239 |
| 6,173,976 B1 * | 1/2001 | Lee | 280/87.05 |
| 6,270,095 B1 | 8/2001 | Chang | |
| 6,301,749 B1 * | 10/2001 | Chen | 16/429 |
| 6,305,698 B1 * | 10/2001 | Liang | 280/87.041 |
| 6,317,923 B1 * | 11/2001 | Lo | 16/110.1 |
| 6,367,829 B1 * | 4/2002 | Lee | 280/87.05 |
| 6,450,517 B1 * | 9/2002 | Lee | 280/87.041 |
| 6,481,729 B2 * | 11/2002 | Herman et al. | 280/87.05 |
| 6,827,673 B2 * | 12/2004 | Chen et al. | 482/77 |
| 6,877,756 B2 * | 4/2005 | Yamabe | 280/287 |
| 6,957,818 B2 * | 10/2005 | McClure et al. | 280/14.28 |
| 6,986,522 B2 * | 1/2006 | Sinclair et al. | 280/287 |
| 7,243,573 B2 * | 7/2007 | Bass et al. | 74/551.1 |
| 7,419,171 B1 * | 9/2008 | Ka Ming | 280/87.041 |
| 7,976,035 B2 * | 7/2011 | Chan | 280/87.05 |
| 2002/0093161 A1 * | 7/2002 | Udwin et al. | 280/87.05 |
| 2003/0222424 A1 * | 12/2003 | Huang | 280/287 |

* cited by examiner

*Primary Examiner* — Katy M Ebner
(74) *Attorney, Agent, or Firm* — McDermott Will & Emery LLP

(57) ABSTRACT

A scooter features a top tube attached to the top portion of a steering column and handlebars having handgrips and stems, with the stems sized to be received within the open ends of the top tube when in a use configuration. A handlebar holder housing covers a top portion of the steering column and a portion of the top tube and includes holding bores sized to receive the handlebar stems when the handlebars are in a storage configuration. The handlebar stems are provided with spring pins that engage use apertures and storage apertures formed in the top tube and housing, respectively, when in the handlebars are in the use and storage configurations. A cord passes through the top tube and is fastened to the handlebars. The handlebar holder housing includes cord slots in communication with the holding bores and receive the cord when the first and second handlebars are in the storage configuration.

12 Claims, 6 Drawing Sheets

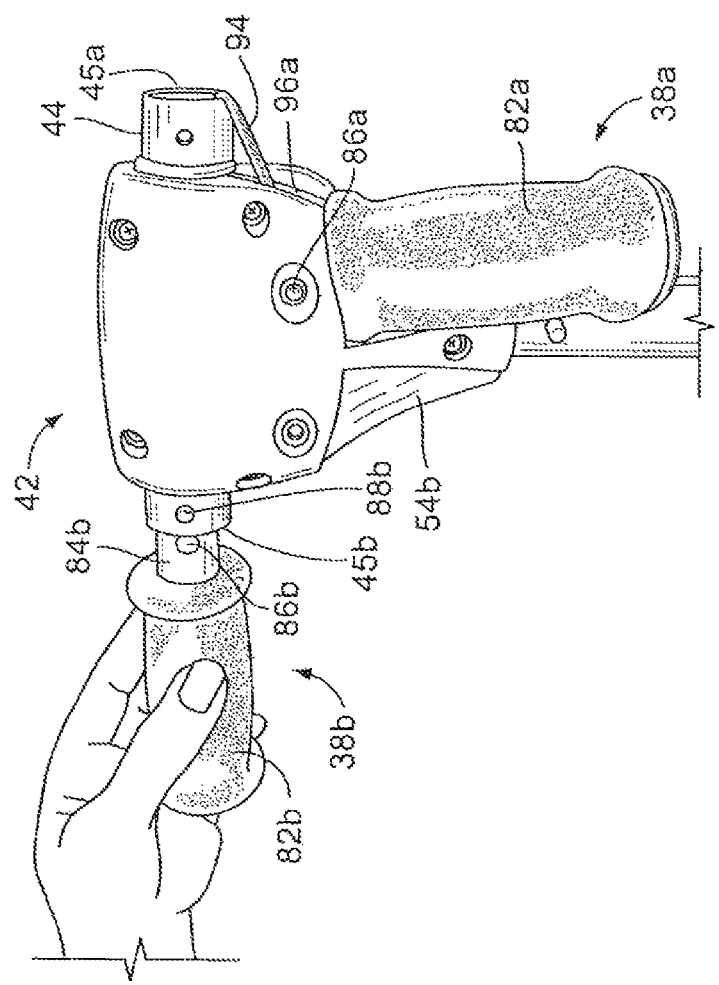
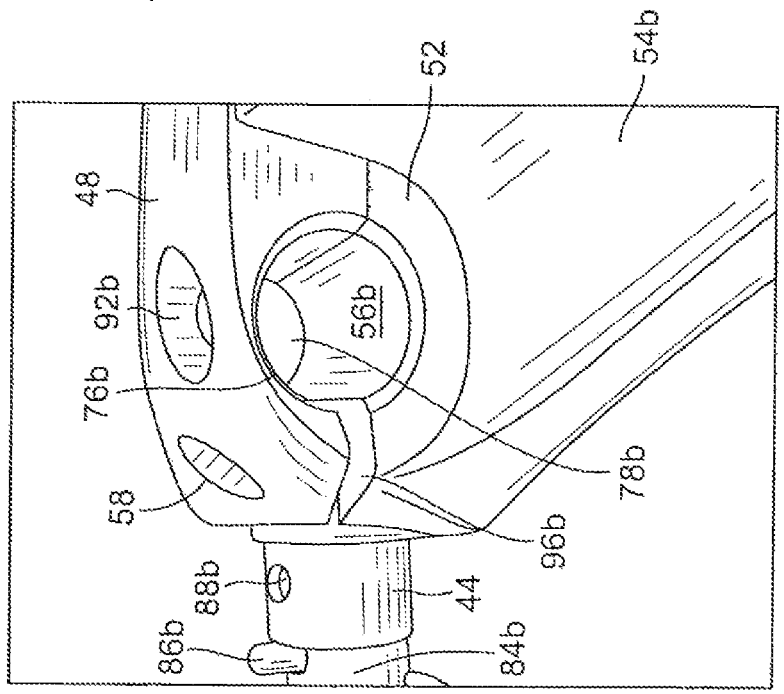

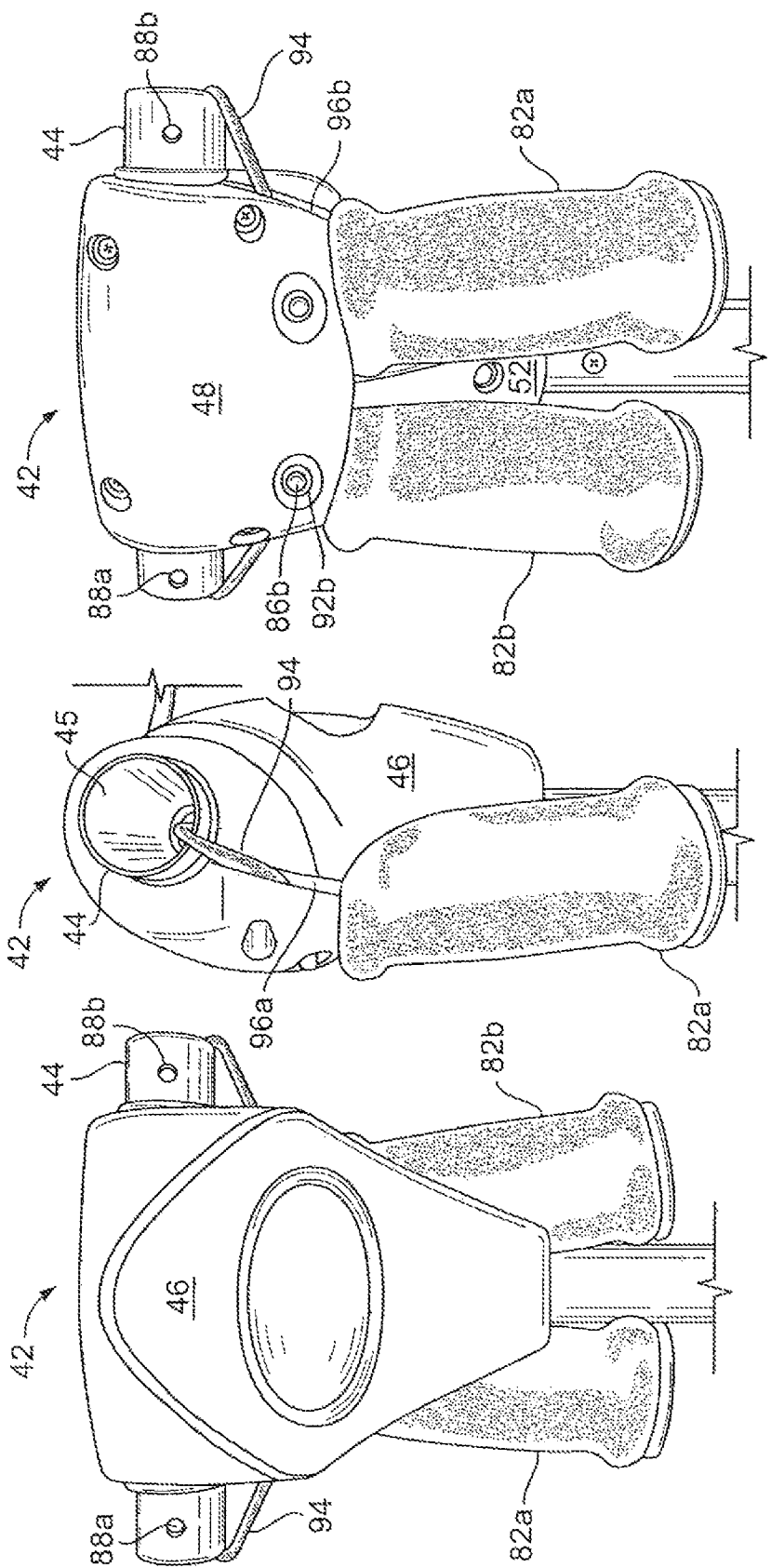

SCOOTER HANDLEBAR HOLDER

BACKGROUND

The present invention relates generally to scooters and, more particularly, to a holder for scooter handlebars and a method of using same.

Scooters have long been popular children's toys. A variety of folding scooter designs exist and offer convenient carrying, storing and shipping. Most folding scooter designs feature a steering column that is pivotally attached at its bottom end to the deck of the scooter. As a result, the steering column may be folded towards the scooter deck to provide a compact profile.

The prior art also includes folding scooters where the handlebars of the scooter may be folded and/or detached to further reduce the folded dimensions of the scooter. Examples of such scooters may be found in U.S. Pat. Nos. 6,270,095 to Chang and 6,481,729 to Herman et al. Both the Chang '095 patent and the Herman et al. '729 patent illustrate a scooter featuring a generally vertical steering column having a generally horizontal top tube positioned on the top end of the steering column. Each patent also illustrates a pair of handlebars with each having a top tube engagement portion sized to fit one each within one of the open ends of the top tube. The Chang '095 patent illustrates spring pins provided for each of the handlebar top tube engagement portions and corresponding holes formed in the top tube. The spring pins engage the top tube holes to secure the handlebars in a use configuration. A pair of C-shaped clamps are mounted on each of the steering columns of the scooters of the Chang '095 and Herman et al. '729 patents and receive the handlebars when they are removed from the top tube open ends. Both the scooters of the Chang '095 and Herman et al. '729 patents feature a cord that runs though the top tube and is attached to the end cap of each handlebar so that the handlebars may not be completely detached from the scooters and lost.

A disadvantage of the scooters of the Chang '095 and Herman et al. '729 patents, however, is that there is no mechanism for attaching the handlebars to the C-shaped clamps of each scooter. As a result, the handlebars may fall or be unintentionally knocked out of the C-shaped clamps. A further disadvantage of these scooters is that when the handlebars are being stored in the C-shaped clamps, large portions of their cords are exposed. These exposed cord portions may be snagged or caught on something as the scooter is carried, which could cause one or both handlebars to become detached from the C-shaped clamps and/or the scooter to be yanked out of the user's hands.

A need therefore exists for a scooter handlebar holder that securely holds the handlebars in a compact and stored configuration and that minimizes exposure of the associated handlebar cord to prevent snagging of the cord.

BRIEF DESCRIPTION OF THE DRAWINGS

FIG. 6 is an enlarged partial bottom perspective view of one of the bores and slots of the handlebar holder of FIGS. 3-4 when the corresponding handlebar is not in the storage configuration;

FIGS. 7A-7C are rear perspective views of the handlebar holder of FIGS. 1-6 illustrating one of the handlebars in a storage configuration and the other handlebar being moved from the use configuration to the storage configuration;

FIG. 8 is a front elevation view of the top portion of the steering column, the handlebars and the handlebar holder of FIGS. 1-7C with the handlebars in the storage configuration;

FIG. 9 is a side elevation view of the top portion of the steering column, the handlebars and the handlebar holder of FIGS. 1-7C with the handlebars in the storage configuration;

FIG. 10 is a rear elevation view of the top portion of the steering column, the handlebars and the handlebar holder of FIGS. 1-7C with the handlebars in the storage configuration.

DESCRIPTION OF EMBODIMENTS

Figure 1:
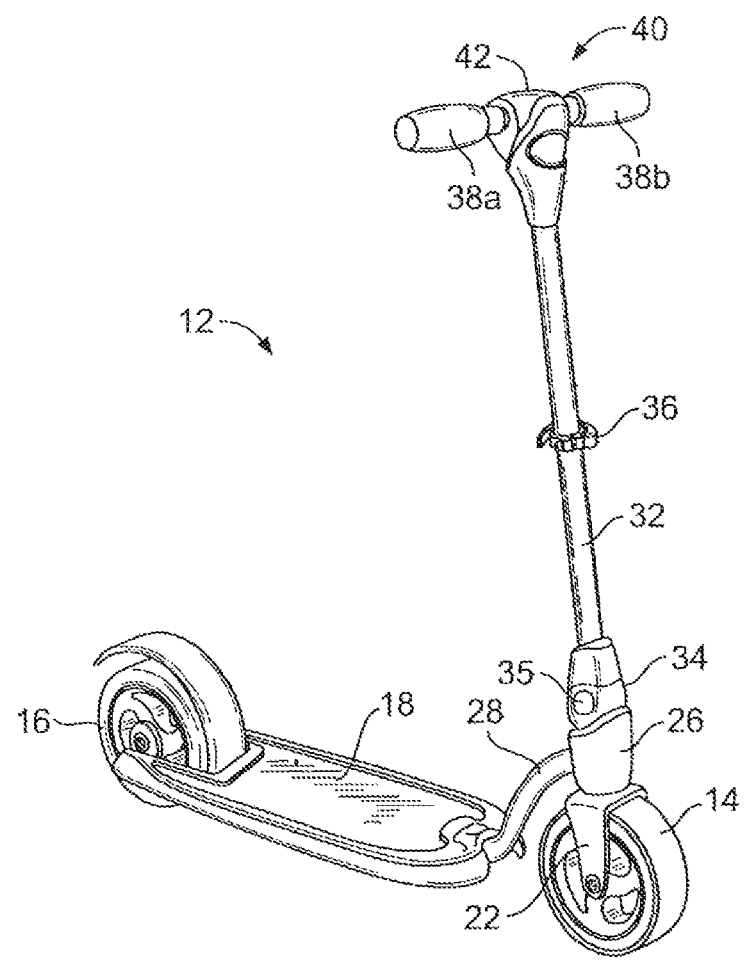
FIG. 1 is a front perspective view of a scooter equipped with an embodiment of the handlebar holder of the invention with the handlebars and steering column both in a use configuration.
Figure 2:
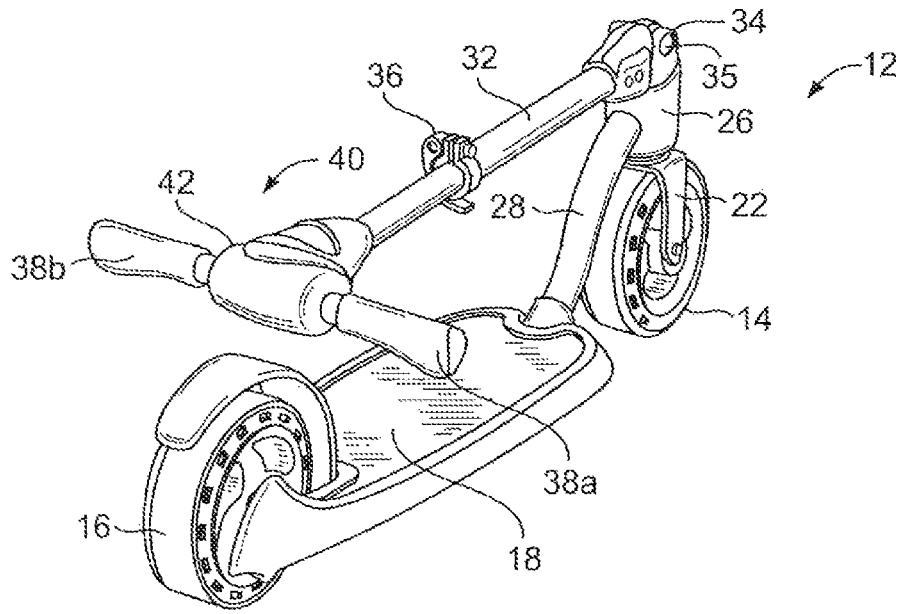
FIG. 2 is rear perspective view of the scooter of FIG. 1 with the steering column in a folded configuration.

An example of a scooter provided with an embodiment of the handlebar holder of the present invention is indicated in general at 12 in FIGS. 1 and 2. While the present invention is described as used on a scooter, it could also be used on any other vehicle or toy that features handlebars.

As illustrated in FIGS. 1 and 2, the scooter features front and back wheels, indicated at 14 and 16, respectively, that are mounted fore and aft of a deck 18. The front wheel is mounted between the arms of a front fork 22 which is pivotally mounted within head tube 26. Head tube 26 is secured to deck 18 via front support member 28. A steering column 32 features a bottom end portion which is mounted to the front fork 22 via a locking folding mechanism 34, such as the one illustrated in commonly owned U.S. patent application Ser. No. 12/004,868, the contents of which are incorporated herein by reference. The steering column 32 may pivoted or folded from the use configuration illustrated in FIG. 1 to the folded storage configuration illustrated in FIG. 2 by pressing button 35 and folding the steering column towards the scooter deck 18. The steering column may optionally include an upper portion and a lower portion that operate in a telescoping fashion so that the height of the steering column is adjustable. The steering column may be locked at a selected height via clip 36. As will be explained in greater detail below, a pair of handlebars 38a and 38b are attached to the top end portion of the steering column so that a rider may turn the front wheel of the scooter.

An embodiment of the handlebar holder of the invention is indicated in general at 40 in FIGS. 1-4. Enlarged views of the handlebar holder are provided in FIGS. 3 and 4. An exploded view of the housing of the handlebar holder is provided in FIG. 5. The handlebars 38a and 38b are illustrated in a use configuration in FIGS. 1-5. As illustrated in FIG. 5, the top end of the scooter steering column terminates into top tube 44 so that a "T-junction" is formed by the two components. As illustrated in FIGS. 7A-7C and 9, the top tube features open ends 45a and 45b. As will be explained in greater detail below, the handlebars 38a and 38b pass through the open ends 45a and 45b and are attached within the top tube 44 when in the use configuration.

Figure 3:
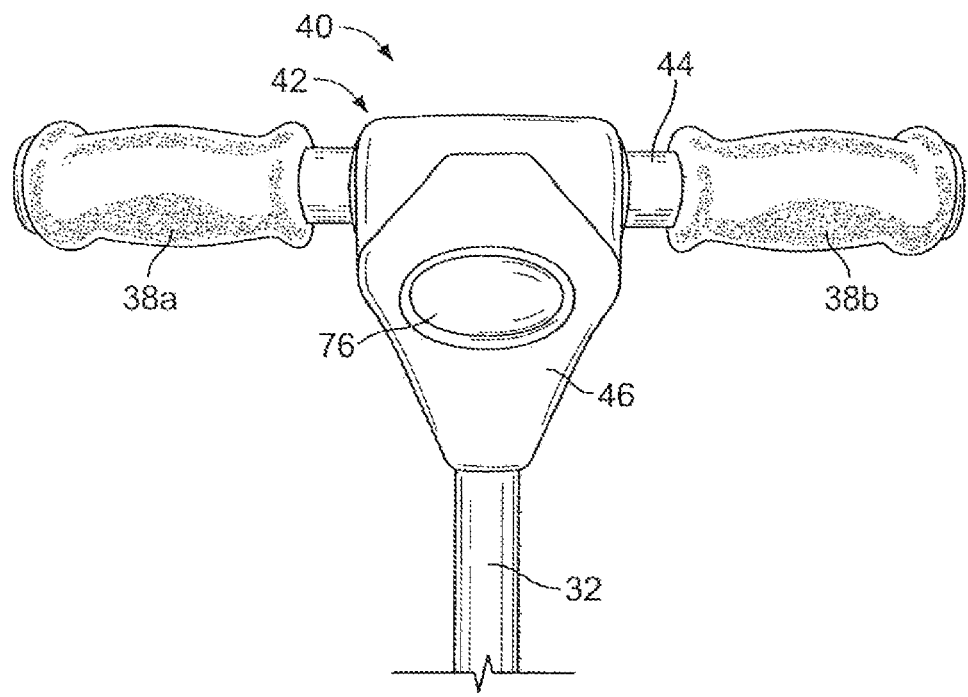
FIG. 3 is an enlarged front elevation view of the top portion of the steering column, the handlebars and the handlebar holder of FIGS. 1 and 2 with the handlebars in a use configuration.
Figure 4:
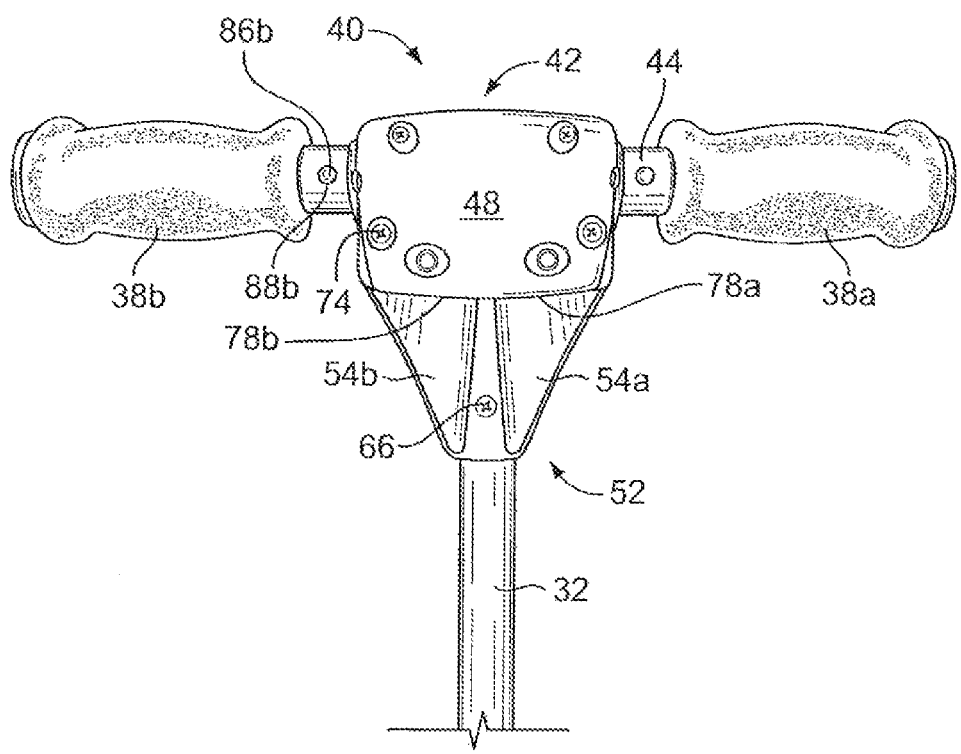
FIG. 4 is a rear elevation view of the top portion of the steering column, the handlebars and the handlebar holder of FIG. 3.
Figure 5:
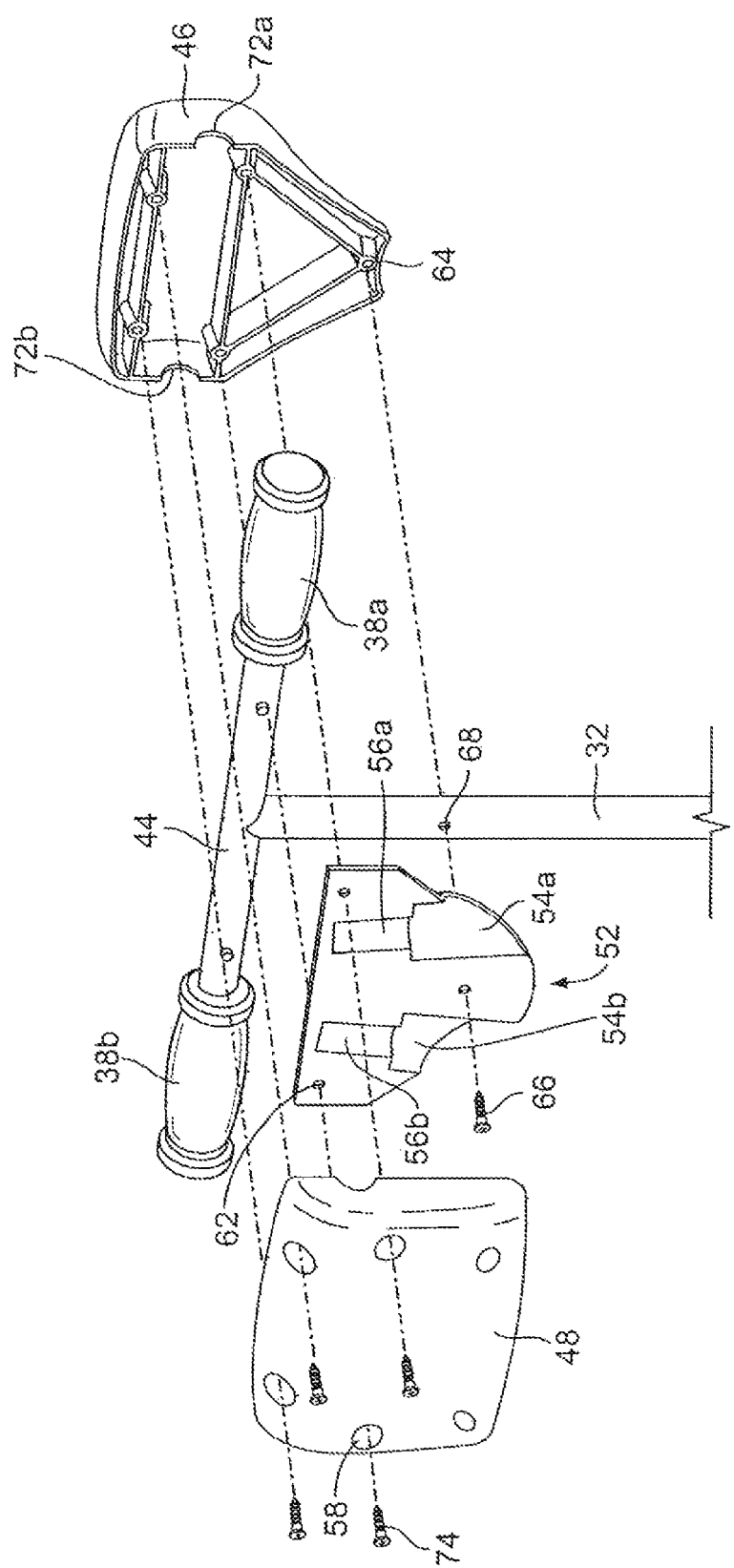
FIG. 5 is a rear perspective, exploded view of the of handlebar holder of FIGS. 3 and 4.

As illustrated in FIGS. 1-5, the handlebar holder features a housing 42 consisting of a front cover 46, a rear cover 48 and a rear insert, indicated in general at 52 in FIGS. 4 and 5. As illustrated in FIGS. 4 and 5, the rear insert 52 features a pair of lower semi-cylindrical recesses 54a and 54b, a smaller pair of upper semi-cylindrical recesses 56a and 56b.

With reference to FIG. 5, the rear cover 48 and insert 52 feature a number of fastener openings 58 and 62, respectively. Front cover 46 features a number of threaded bosses 64. A screw 66 passes through the lower-most fastener opening in the rear insert 52 as well as a hole 68 formed through the steering column 32 and engages the lower-most threaded boss of front cover 46. As a result, the steering column 32 is sandwiched between the rear insert and front cover as illustrated in FIGS. 3 and 4. The top tube 44 is received within the semi-circular cutouts 72a and 72b (FIG. 5) of the front cover 46. With reference to FIG. 5, four additional screws 74 pass through the remaining four fastener openings of the rear cover 48 and engage the corresponding threaded bosses 64 of the front cover 46. The lower two screws also pass through the remaining two openings 62 in rear under panel 52. As a result, the top tube 44 is sandwiched between the rear cover 48 and the front cover 46 while the upper portion of the rear insert 52 and the steering column 32 are sandwiched between the lower portions of the front and rear covers (see FIGS. 3 and 4).

The handlebar holder housing 42 therefore provides an attractive cover for the T-junction formed by the steering column 32 and the top tube 44. As indicated at 76 in FIG. 3, the front surface of the front cover 46 provides an ideal location for placement of attractive indicia or the brand name of the scooter.

The front and rear covers and rear insert of the housing 42 are preferably molded from plastic, although other lightweight and durable materials may be used. In addition, the front and rear cover and/or the rear cover and rear insert may alternatively be molded as a single piece, or the front cover may be manufactured as two or more pieces that are later joined. Alternative fastening arrangements including, but not limited to, rivets, adhesive or a notch and groove arrangement may be used in the place of the screws 66 and 74 of FIG. 5. Of course, the number of screws or other fasteners may be varied from what is shown in the figures.

As illustrated in FIG. 6, the inward facing surface of the housing rear cover 48 features a semi-cylindrical recess 76 that, when the rear cover 48 and rear insert 52 are assembled, as illustrated in FIGS. 3 and 4, combines with upper semi-cylindrical recess 56b (FIG. 5) of rear insert 52 to form a holding bore 78b (see also FIG. 4) in the housing. The inward facing surface of the rear cover 48 is also provided with a semi-cylindrical recess that combines with the upper semi-cylindrical recess 56a (FIG. 5) of the rear insert 52 so that a second holding bore 78a is also defined (see FIG. 4).

Figure 7C:
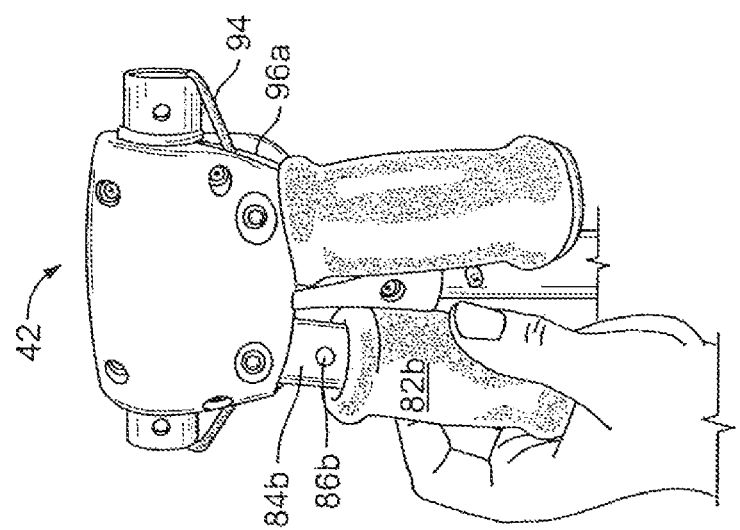

As illustrated in FIGS. 6-7C, handlebar 38b includes a handgrip 82b and a stem 84b. The stem 84b is sized for insertion into the open end 45b of the top tube 44 and is provided with a spring pin 86b. Handlebar 38a features similar components including a handgrip 82a, a spring pin 86a and a stem (not shown) that is sized for insertion into the open end 45a of the top tube. As also illustrated in FIGS. 6-7C, the top tube 44 includes use apertures 88a and 88b and the rear cover 48 includes storage apertures 92a and 92b, each sized to receive spring pins 86a or 86b.

Figure 7B:
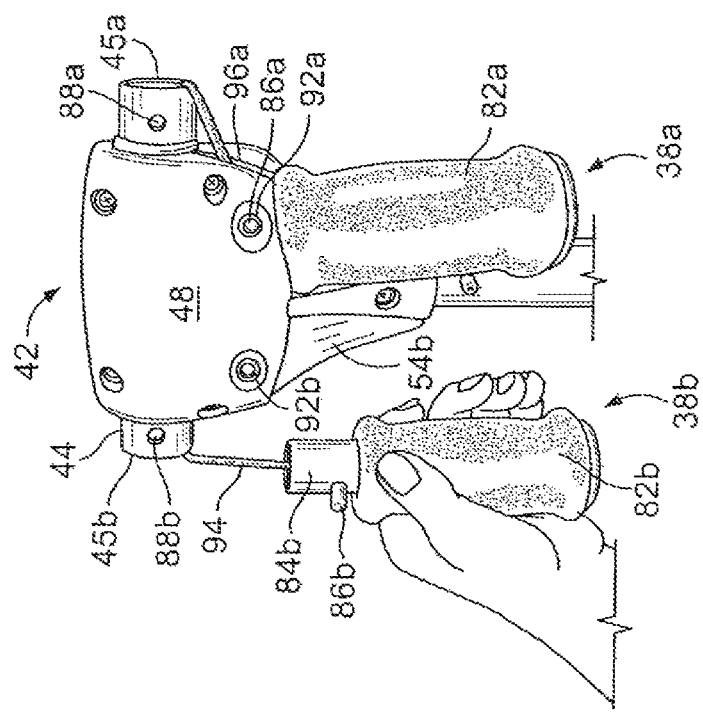

When the scooter is being ridden, the handlebars 38a and 38b are in the use configuration illustrated in FIGS. 1-5, with their stems positioned within the top tube 44 and their spring pins passing through apertures 88a and 88b. When it becomes desirable to place the scooter is a compact configuration for transport and/or storage, the handlebars a placed in the storage configuration illustrated in FIGS. 8-9, with their stems positioned within holding bores 78a and 78b (FIGS. 4 and 6) of the handlebar holder and their spring pins passing through apertures 92a and 92b (FIG. 7B). The steps to reconfigure a handlebar from the use configuration to the storage configuration are demonstrated for handlebar 38b in FIGS. 4, 6, 7A-7C and 10. More specifically, with reference to FIG. 4, the spring pin 86a of the handlebar initially protrudes through and engages the use aperture 88b of the top tube 44. As illustrated in FIGS. 6 and 7A, the user pushes the spring pin 86b inward and pulls the handlebar 38b out of the open end 45b of the top tube 44.

As illustrated in FIGS. 7B and 7C, the user next inserts the stem 84b of the handlebar into the holding bore 78b (FIG. 6) of the housing 42 until the handlebar spring pin 86b snaps into engagement with the storage aperture 92b of the rear cover 48 of the handlebar holder housing and the handgrip portion 82b is positioned within the corresponding lower semi-cylindrical recess of the rear insert 52 of the handlebar holder housing (see FIG. 10). With reference to FIGS. 7A-10, this sequence of steps has already been applied to handlebar 38a so that the spring pin 86a is engagement with storage aperture 92a and handgrip 82a is positioned within the corresponding lower semicircular recess of rear insert 52. Due to the engagement of the handlebar spring pins with the storage apertures of the handlebar holder housing, the handlebars are securely and compactly attached to the housing and thus the steering column of the scooter. As an alternative to the spring pin and apertures illustrated for the handlebar holder housing and top tube, other releasable fastening arrangements known in the art may be used. These include, but are not limited to, a interference or frictional fit, a snap fit, tab and groove or a leaf spring fastening arrangement.

As illustrated in FIGS. 7A-10, a cord 94 runs through top tube 44 and features opposite ends that are joined to the handlebars 38a and 38b. The cord ends may be attached, for example, to the end portions of the handgrips 82a and 82b. As an alternative to a single cord, the cord 94 may be formed as two pieces with each piece having a distal end attached to one of the handlebars and a proximal end attached to the top tube. The cord preferably is constructed from elastic material. The cord prevents the handlebars from being dropped and/or lost after they are separated from either the top tube or the handlebar holder.

As illustrated in FIGS. 6-10, the handlebar holder housing features a pair of cord slots 96a and 96b which communicate with the holding bores and receive the cord 94 when the handlebars are in the storage configuration illustrated in FIGS. 8-10. As a result, the portion of cord exposed when the handlebars are in the storage configuration is minimized so as to reduce the chances that the cord will be caught or snagged as the scooter is carried or stored.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A handlebar holder for a vehicle comprising:
   a) a housing adapted to connect to a steering column of a vehicle, said housing including a first holding bore and a second holding bore adapted to receive a first handlebar and second handlebar of the vehicle, respectively;

b) a fastening arrangement for releasably securing the first and second handlebars in the first and second holding bores;

c) said housing including first and second lower semi-cylindrical recesses, said first and second lower semi-cylindrical recesses adapted to receive first and second handgrips of the first and second handlebars of the vehicle, respectively, when first and second stems of the first and second handlebars are secured within the first and second holding bores, respectively.

2. The handlebar holder of claim 1 wherein the housing includes a front cover, a rear cover and an insert wherein the rear cover includes first and second semi-cylindrical recesses and the insert includes first and second upper semi-cylindrical recesses and the lower first and second semi-cylindrical recesses, said rear cover first and second semi-cylindrical recesses and said insert first and second upper semi-cylindrical recesses respectively joining to define the first and second holding bores when the front cover, rear cover and insert are assembled.

3. A scooter comprising:
a) a deck;
b) a rear wheel attached to a rear portion of the deck;
c) a steering column pivotally attached to a front portion of the deck, said steering column including a top portion and a bottom portion;
d) a front wheel attached to the bottom portion of the steering column;
e) a top tube attached to the top portion of the steering column and featuring first and second open ends;
f) a first handlebar having a first handgrip and a first stem, said first stem sized to be received within the first open end of the top tube when the first handlebar is in a use configuration;
g) a second handlebar having a second handgrip and a second stem, said second stem sized to be received within the second open end of the top tube when the second handlebar is in a use configuration;
h) a handlebar holder housing attached to said steering column and including first and second holding bores sized to receive the first and second handlebars stems, respectively, when the first and second handlebars are in a storage configuration;
i) a use fastening arrangement for securing the first and second handlebar stems in the first and second ends of the top tube, respectively, when the first and second handlebars are in the use configuration; and
j) a storage fastening arrangement for releasably securing the first and second handlebar stems in the first and second holding bores of the handlebar holder housing, respectively, when the first and second handlebars are in the storage configuration;
said handlebar holder housing including first and second lower semi-cylindrical recesses, said first and second lower semi-cylindrical recesses adapted to receive the first and second handgrips of the first and second handlebars, respectively, when the first and second handlebars are in the storage configuration.

4. The scooter of claim 3 wherein the handlebar holder housing covers a top portion of the steering column and a portion of the top tube.

5. The scooter of claim 3 further comprising a locking folding mechanism securing the steering column to the deck so that the steering column may be folded towards the deck.

6. The scooter of claim 3 further comprising a cord passing through the top tube and having opposing ends fastened one each to the handlebars and wherein the handlebar holder housing includes a first cord slot and a second cord slot, said first cord slot in communication with the first holding bore and an exterior of the housing and said second cord slot in communication with the second holding bore and an exterior of the housing, said first and second cord slots each adapted to receive the cord when the first and second handlebars are in the storage configuration.

7. The scooter of claim 3 wherein the handlebar holder housing includes a front cover and a rear cover that are fastened together.

8. The scooter of claim 7 wherein the front and rear covers are adapted to receive the steering column and the top tube therebetween.

9. The scooter of claim 3 wherein the handlebar holder housing includes a front cover, a rear cover and an insert wherein the rear cover includes first and second semi-cylindrical recesses and the insert includes first and second upper semi-cylindrical recesses and the lower first and second semi-cylindrical recesses, said rear cover first and second semi-cylindrical recesses and said insert first and second upper semi-cylindrical recesses respectively joining to define the first and second holding bores when the front cover, rear cover and insert are assembled.

10. The scooter of claim 3 wherein the use fastening arrangement includes first and second spring pins projecting from the first and second handlebar stems, respectively, and first and second use apertures formed in the top tube and sized to receive the first and second spring pins, respectively, when the first and second handlebars are in the use configuration.

11. The scooter of claim 10 wherein said storage fastening arrangement includes a first storage aperture and a second storage aperture formed in the handlebar holder housing, said first storage aperture in communication with the first holding bore and an exterior of the housing and said second storage aperture in communication with the second holding bore and an exterior of the housing, said first and second storage apertures each sized to receive the first and second spring pins, respectively, when the first and second handlebars are in the storage configuration.

12. The scooter of claim 3 wherein the handlebar holder housing is molded from plastic.

\* \* \* \* \*